United States Patent [19]

Spevack

[11] 3,920,395

[45] Nov. 18, 1975

[54] DUAL TEMPERATURE CONCENTRATION SYSTEM

[75] Inventor: Jerome S. Spevack, New Rochelle, N.Y.

[73] Assignee: Deuterium Corporation, White Plains, N.Y.

[22] Filed: Sept. 26, 1966

[21] Appl. No.: 587,363

Related U.S. Application Data

[60] Continuation of Ser. No. 822,974, June 25, 1959, abandoned, which is a division of Ser. No. 188,925, Sept. 29, 1950, Pat. No. 2,895,803.

[52] U.S. Cl. .................... 423/580; 203/5; 203/10; 203/12; 203/50
[51] Int. Cl. ............................................ C01b 4/00
[58] Field of Search ................ 23/204, 181, 1, 210 I

[56] References Cited
UNITED STATES PATENTS

| | | | |
|---|---|---|---|
| 2,690,382 | 9/1954 | Joris | 23/210 |
| 2,787,526 | 4/1957 | Spevack | 23/204 |
| 2,895,803 | 7/1959 | Spevack | 23/204 |
| 3,142,540 | 7/1964 | Spevack | 23/204 |

*Primary Examiner*—Edward Stern
*Attorney, Agent, or Firm*—Hall & Houghton

[57] ABSTRACT

In a dual temperature isotope exchange system— exemplified by exchange of deuterium and protium between water and hydrogen sulfide gas in hot and cold towers, in which the feed stream (water) containing the desired isotope is passed through a pair of towers maintained at different temperatures wherein it effects isotope exchange with countercurrently circulated auxiliary fluid ($H_2S$) and is impoverished in said isotope and then disposed of, e.g. discharged to waste,— the flow of isotope enriched auxiliary fluid between said towers (hot $H_2S$ saturated with water vapor) is divided and a part thereof is adjusted in its temperature (to cold tower conditions) and then passed to the auxiliary fluid impoverishing (cold) tower, while the remainder of the divided flow of such enriched auxiliary fluid is passed through a subsequent isotope concentration treatment to produce a product more highly enriched in the desired isotope and wherein it is also adjusted in its temperature and is impoverished in said isotope during said subsequent treatment before it is delivered to the said auxiliary fluid impoverishing (cold) tower. Certain provisions are made for returning to the hot tower liquid carried as vapor by the remainder of the divided flow to the subsequent isotope concentration treatment, for recovering sensible and latent heat, and for reducing passage of auxiliary fluid to waste.

15 Claims, 7 Drawing Figures

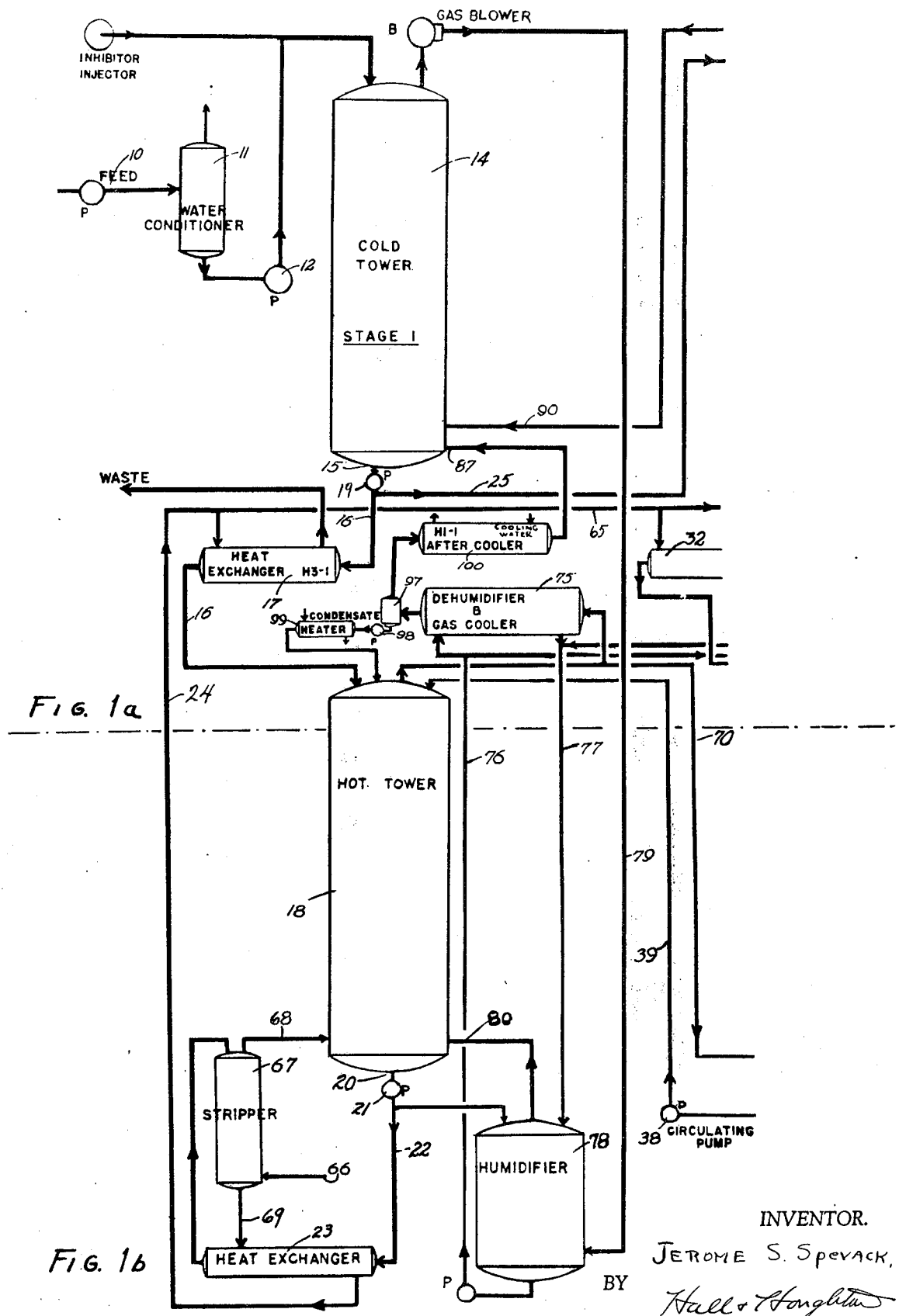

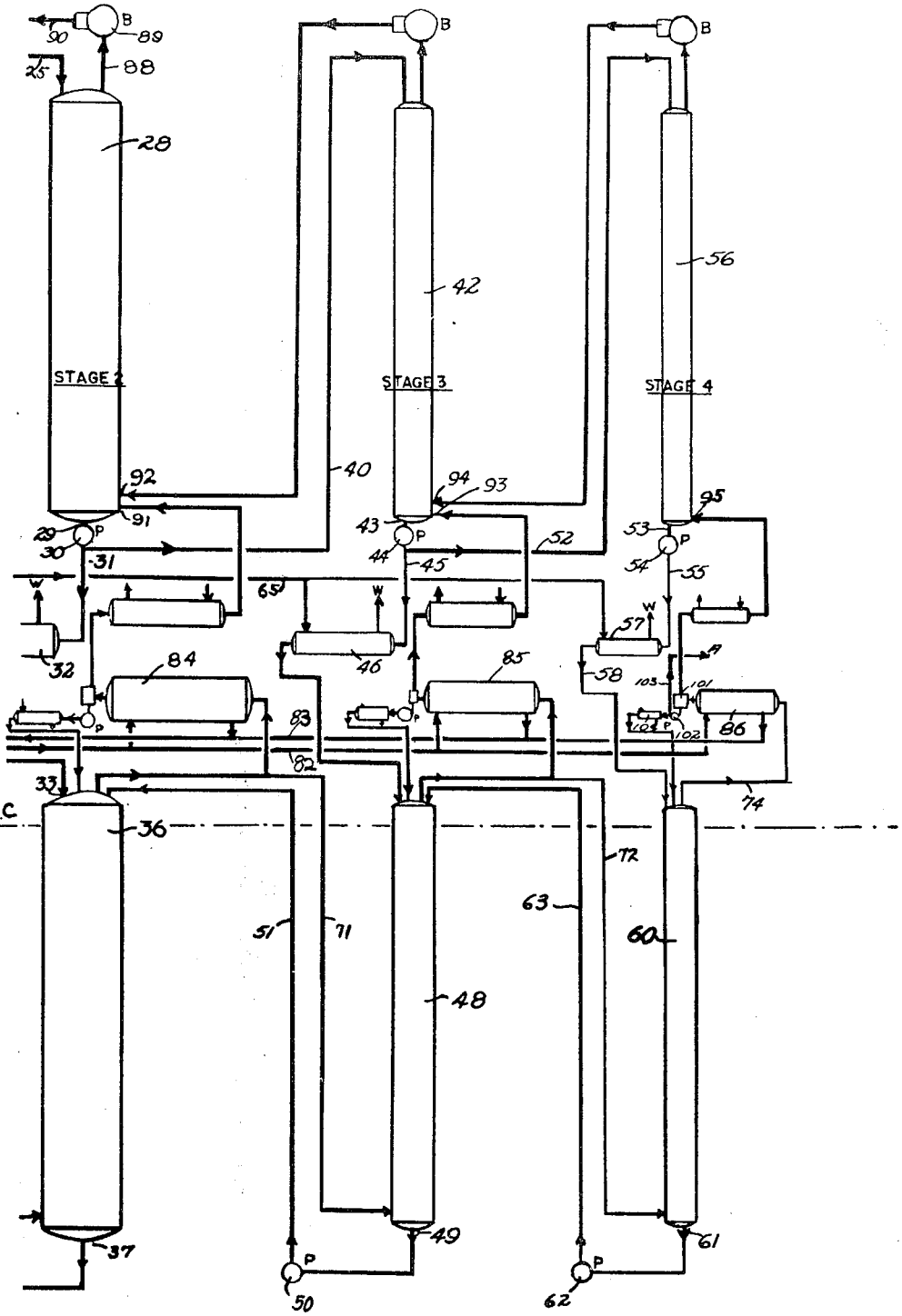

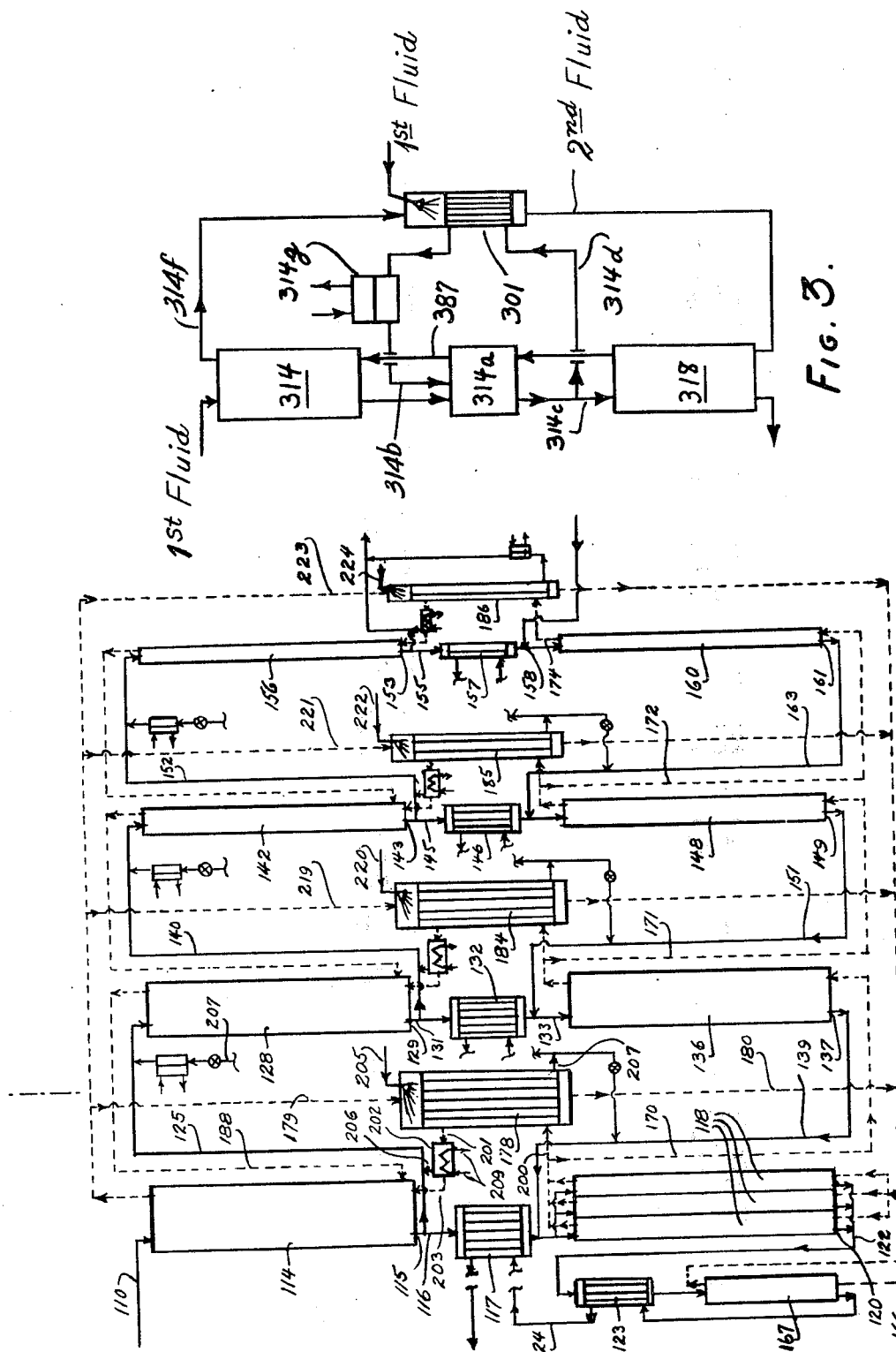

DUAL TEMPERATURE CONCENTRATION SYSTEM

This application is a continuation of my copending application Ser. No. 822,974 (which has been abandoned after the filing hereof) which was filed June 25, 1959 as a division of my copending parent application Ser. No. 188,925 filed Sept. 29, 1950 (now patent No. 2,895,803 issued July 21, 1959; see also Pat. No. 3,142,540 issued July 28, 1964 on a division of said parent application).

The described invention which is claimed herein relates to improvements in methods and apparatus for the control of temperature, saturation and solubility in systems in which both liquid and gas are present together, at different temperatures in different locations in the system. In such systems, for instance, as disclosed in U.S. Pat. No. 2,787,526, issued Apr. 2, 1957, a single stage system or each stage of a cascade employs a cold tower and a hot tower and the progress of the exchange reactions through the system has required alternate and repeated cooling and heating of the substances involved in a very costly manner. These temperature reversals taken with the humidity variations and loss of costly materials with the waste have constituted the outstanding factors in the operating costs and have been determinative of the practicability of the system.

An object of this invention is to provide improved systems for reducing such cost factors in a manner economizing on the energy to be supplied and greatly reducing the cost of operation while at the same time maintaining the rate and quality of output.

Further objects of the invention will appear from the following specification taken in connection with the accompanying drawings in which:

FIGS. 1a, 1b, 1c, and 1d show diagramatically an arrangement illustrating preferred embodiments of the present invention associated in an integrated cascade embodiment of a system of the class described;

FIGS. 2a and 2b show diagramatically, a modification;

FIG. 3 is a diagram of a further modification.

The features of the present invention are typically illustrated in connection with the concentration of deuterium by countercurrent reactions at contrasting high and low temperatures. The reactants in this exemplary embodiment are hydrogen sulfide gas ($H_2S$) and liquid water ($H_2O$).

Both of these substances contain chemically different forms of hydrogen, which are capable of undergoing a reversible exchange reaction. In such a reaction an equilibrium is established between the light and heavy hydrogen isotopes. Since the mechanism of the exchange reaction is ionic, no catalyst is required.

The system at each stage makes use of two towers, a cold temperature tower and a hot temperature tower. The isotopic exchange reactions involved in this illustrative embodiment are:

$$HDS + H_2O \rightleftharpoons H_2S + HDO$$
$$D_2S + HDO \rightleftharpoons HDS + D_2O$$
$$HDS \rightleftharpoons H_2S + D_2S$$
$$HDO \rightleftharpoons H_2O + D_2O$$

Expressed in ionic form, the above chemical exchange equilibria are:

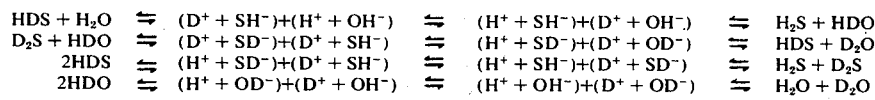

Wherein the primary ions may further ionize as:

$$SH^- \rightleftharpoons H^+ + S^= \qquad OH^- \rightleftharpoons H^+ + O^=$$
$$SD^- \rightleftharpoons D^+ + S^= \qquad OD^- \rightleftharpoons D^+ + O^=$$

Equilibrium conditions favor concentration of the deuterium in the water phase with a greater concentration effect occurring at the lower temperature. Proper operation of the system gives rise to a concentration gradient in the towers and causes an accumulation, in this illustrative embodiment, of deuterium as heavy water at the bottom of the cold tower.

Feed water enters the system at the top of the cold tower, passes through the cold tower into the top of the hot tower, and leaves as waste from the bottom of the hot tower which waste may in turn be used as the supply to a separate subsequent system. Hydrogen sulfide gas is continuously recycled from the top of the cold tower to the bottom of the hot tower, always flowing countercurrent to the water. Suitable heat exchangers are provided to heat or cool the gas and liquid streams before their entry into the towers.

In each stage the cold tower acts as the concentrating tower. Inasmuch as equilibrium conditions favor the presence of deuterium in the water phase, then as the water stream passes through the cold tower it becomes enriched in deuterium, while the hydrogen sulphide stream becomes depleted. Depletion of deuterium in the gas stream continue to a point where at the top of the cold tower it approaches its equilibrium concentration with the feed water.

The function of the hot tower is the reverse of the cold tower. This tower acts as a deuterium stripper, and thereby provides deuterium reflux to the cold tower. Since the equilibrium constant at the hot tower temperature is not as favorable to deuterium concentration in the water, the water which has passed into the hot tower from the cold tower is obliged to return its excess deuterium to the hydrogen sulphide stream. This redistribution of deuterium from liquid to gas goes on through the entire length of the hot tower and continues to a point where at the bottom of the hot tower the water approaches its equilibrium concentration with the hydrogen sulphide. Therefore, since the quantity of deuterium entering with the hydrogen sulphide at the bottom of the hot tower is essentially the same as that which has left the top of the cold tower, and since the liquid and gas streams tend to approach equilibrium with each other at either end of the system, then the deuterium concentration in the water leaving the hot tower must be less than its concentration in the feed water which enters the cold tower.

By repeated operation, this mechanism causes a growing accumulation of deuterium at the bottom of the cold tower and thereby enables the continuous removal of a concentrated product.

In the arrangement of FIGS. 1a–1b the supply of liquid, e.g. water, enters at 10 and passes through water conditioner 11 and pump 12 to the top of the cold tower 14 of the first stage. As hereinafter explained, there is a countercurrent of gas ($H_2S$) passing upward in this tower 14, the temperature of this cold exchange reactor being maintained at about 20°C., for instance, for a pressure of 5 atmospheres.

The cold liquid discharged at 15 at the bottom of the tower by pump 19 is divided, one portion going by conduit 16 through heat exchanger 17 to be heated thereby and passed on to the top of the hot tower 18 of this first stage. Here again there is a countercurrent of gas for the hot (80°C.) exchange reaction and the hot liquid discharged at 20 at the bottom of the tower is passed by pump 21 and conduit 22 through stripper 67 and heat exchanger 23 removing dissolved gas ($H_2S$) from the liquor and raising the temperature of the liquor which then passes through conduit 24 to heat exchanger 17 where it serves to raise the temperature of the first stage liquid passing from the cold to the hot tower. The discharge of this circulation of heating liquid from exchanger 17 passes to waste.

The other portion of the cold liquid discharged from the cold tower at 15 passes by conduit 25 to subsequent operations, from which hot liquid may be received through pipe 39 to the top of the hot tower 18. Thus in the form shown in FIGS. 1a – 1d the liquid from conduit 25 passes to the top of the cold tower 28 of the second stage for the cold (20°C.) reaction with the upward sweeping countercurrent of gas and the cold liquid discharged at 29 passes through pump 30 and in part through pipe 31 and heat exchanger 32 raising the temperature of the liquid for entry at 33 into the hot tower 36 where it meets the countercurrent of gas, this hot reaction being at about 80°C. and discharging the hot liquid at 37 to pump 38 passing the liquid through pipe 39 to the top of the hot tower 18. The remainder of the cold discharge from tower 28 passes by piping 40 to the top of the cold tower 42 of the third stage where it is reacted by the countercurrent gas and discharged at 43 to be passed by pump 44 and by piping 45 to heat exchanger 46 raising its temperature for discharge through piping 47 to the top of the hot (80°C.) tower 48 and is subjected to reaction with the countercurrent gas and discharge at 49 through pump 50 passing the hot liquid through piping 51 to the top of the next preceding hot tower 36. The other part of the cold discharge from tower 42 passes by pipe 52 to the top of the fourth stage cold tower 56 at 20°C. where it reacts with the countercurrent gas and is discharged at 53 through pump 54 and piping 55 to heat exchanger 57 and piping 58 to the hot tower 60. The discharge of hot liquid from this tower at 61 is passed by pump 62 and piping 63 to the top of the hot tower 48 of the preceding stage, completing the circuit of the liquid within the system unless additional stages are found advantageous.

No temperature treatment is required for the liquid flows to the cold towers assuming an initial supply at the right temperature. The liquids supplied to the hot towers are raised in temperature by the heated waste discharge. In the form shown this waste discharge flows from the primary hot tower 18, and waste pipe 24 is connected to feed pipe 65 leading to the heat exchangers 32, 46 and 57 of the second, third and fourth stages respectively. The temperature regulation of the liquid is thus provided from sources within the system and additional steam is only drawn upon in connection with the final stripping of the discharge liquor at 67 and return of the separated gas to the hot tower 18.

This stripping arrangement is another feature of the improved system whereby dissolved gas ($H_2S$) is removed from the waste liquor in a simple but effective way at essentially no extra energy expense. It comprises means by which the amount of steam that is still required to make up for the process inefficiencies and to complete the gas heating and humidification as hereinafter explained, is put to an additional use before it enters the hot tower 18. This steam entering at 66 is passed countercurrent to the processed waste liquor in the contact stripping tower 67. In this manner the dissolved hydrogen sulphide is removed from the waste liquor and swept back through outlet pipe 68 to the hot tower 18 together with the steam. Stripping efficiency which leaves less than one part per million residue may be attained. The hot liquid discharge at 69 from stripper 67 is circulated in heat exchanger 23 to increase the temperature of the waste liquor supply prior to its employment for heating fluid flowing from a cold tower to a hot tower. In the form shown the augmented temperature waste liquid from 23 is applied to heat a plurality of liquid streams flowing from cold towers to hot towers. By delivering it to the subsequent heaters 17, 32, 46 and 57 for the liquid entering the hot towers, the liquor being raised, for instance, from 80°C. in conduit 22° to 85°C. in conduit 24.

The conditioning of the countercurrent gas (for instance ($H_2S$) is attained by this invention with utmost economy. The gas supplied to the cold tower 14, and in the cascade form shown to the cold towers 28, 42 and 56, is efficiently cooled and dehumidified and the gas supply to the hot tower 18 is heated and humidified with interchange of energy between these operations. In the multi-stage form shown, the hot towers of the remaining stages receive their supplies from the hot towers of the previous stages, so that all treatment of the gas supplies to the second, third and fourth stage hot towers is dispensed with. This novel multi-stage arrangement, results in a type of cascade system which integrates the plant so that each stage is not an independent unit but is a working part of the overall system. The hot humidified gases required at the bottom of the second stage hot tower 36 are obtained through piping 70 from the hot gases leaving the hot tower 18 of the first stage, and all of the hot liquor from the hot tower 36 of the second stage returns by piping 39 to the hot tower 18 of the first stage. Similarly hot tower 48 receives its gas supply from preceding hot tower 36 by piping 71 and returns to tower 36 its hot liquor discharge by piping 51, while hot tower 60 receives its hot gas through pipe 72 from the preceding hot tower 48 and returns to tower 48 its hot liquid discharge through pipe 63. In said multistage arrangement, the final discharge of hot gases from fourth stage hot tower 60 pass out through piping 74 to subsequent conditioning treatment and is then used to supply the countercurrent gas to cold tower 56 of the fourth stage.

An important aspect of the present system is the recovery and use of the low level energy which is available in the cooling and dehumidification of hot humidified gases. Instead of cooling these hot gases with cooling water and wasting the heated water, by the present invention the latter is circulated in a cyclic treatment reclaiming the heat and using it for heating and humidification of gases entering the hot tower.

In the system shown the hot gases from the tower 18 must be cooled and dehumidified before they can be used in the cold tower 14, and in the multi-stage arrangement shown the same problem is presented at each following stage. In accordance with this invention, a supply of these hot gases from tower 18 on their way to the cold tower 14 are passed through the dehumidifier and gas cooler 75 which is cooled by water supplied by pipe 76. This water raised in temperature is fed by pipe 77 to the top of a special humidifier tower 78 and through this tower 78 the cold gases brought by pipe 79 from cold tower 14 are passed in direct contact countercurrent to the hot water. By this efficient direct contact method the cold gases are simultaneously heated and humidified while the circulating liquor is cooled. The hot humidified gases are passed by pipe 80 into the hot tower 18. The cooled liquor is recirculated to the dehumidifier and cooler 75 to pick up another change of energy for delivery to the humidifier 78. Thus, the recirculated liquid circulates in a closed cycle 75, 77, 78, 76. In the system shown, in which the recirculated liquid comprises water, a small amount of make-up water is continuously added to this liquor cycle in order to replace that portion which is consumed in humidification of the gas stream. This may conveniently be drawn from the discharge pipe 22 from hot tower 18 or from the feed, etc.

A further advantage of the embodiment shown in FIGS. 1a – 1d is that all of the energy from the dehumidifiers of all of the stages is available for humidification and gas heating in the humidifier 78 of the first stage. These stages, two, three and four, receive their hot gases direct from the preceding stage in each case and so humidifiers for these stages are dispensed with. In each of these stages the corresponding dehumidifier and cooler 84, 85, 86 intervening in the gas passage between the hot tower and the cold tower is cooled by circulation from pipe 82, drawing its supply from pipe 76, and pipe 83 returning the discharges to pipe 77 so that these dehumidifiers 84, 85, 86 of these subsequent stages are in circuit with the cyclic circulation through humidifier 78 and supply energy thereto.

In the cascade system shown, the cooled gases from hot tower 18 pass into the bottom of cold tower 14 at 87 and are joined there by the cold gases brought from the cold tower 28 by pipe 88, gas pump 89 and pipe 90. Similarly the cold tower 28 is supplied at 91 with cooled gases from hot tower 36 and at 92 with cold gases from tower 42, while tower 42 receives cooled gases at 93 from hot tower 48 and at 94 is supplied with cold gases from cold tower 56, which latter tower receives its supply of gases at 95 solely from hot tower 60.

In addition to the dehumidifying and cooling of the hot gases at 75, 84, 85, 86, they may be subjected to a separating action by appropriate means, arranged as is separator 97, for receiving the discharge from cooler 75 and separating out the liquid which is passed by pump 98 to heater 99 and delivered into the top of the hot tower 18. The energy for heater 99 is supplied from an outside source. The gas discharge from separator 97 is further cooled in aftercooler 100 supplied with cooling circulation from any suitable source and the condensate from this aftercooler is carried into tower 14 with the gas stream. Similar condensers and coolers may be provided at the subsequent stages as shown.

In the final stage of the cascade system of FIGS. 1a–1d the separator 101 separates out the liquid content of the gases from condenser 86 and pump 102 delivers the condensate to discharge pipe 103 and heater 104 from which the liquid raised in temperature is returned to the hot tower 60.

The condensate from the dehumidification and cooling of the hot tower gas is relatively high in concentration of HDO and $D_2O$ and may serve as the product or as a supply for further concentration in additional stages or another system if desired.

The overall process practiced by this illustrative embodiment of the invention relies on ordinary water as the deuterium source; the gas, hydrogen sulphide, merely acts as an exchange medium and is recycled without being consumed. Make-up gas in small amounts may be supplied preferably at the entrance to the cold tower of the first stage.

The diagrammatic showing and descriptions herein are merely illustrative and descriptive of the plant and its operation in the illustrative application, and changes in tower height, number of stages, temperature of operation, pressure of operation, the kinds of substances used, the particular material to be concentrated, the use of catalysts to enhance rate of exchange, variations of design within a countercurrent temperature exchange and other details may be resorted to within the principle of the invention.

The modified cascade system to which the invention is applied in FIGS. 2a and 2b is shown with four stages the first of which has the hot reaction divided between three parallel hot towers 118. In general the handling of the flow and the connections of the reactors and stages are similar and the parts in FIGS. 2a and 2b are in most instances numbered one hundred above the numbers applied to the corresponding parts in FIGS. 1a to 1d. For simplicity the pumps have been omitted from FIGS. 2a and 2b and the liquid stream is in full lines and the gas stream in broken lines. The heat recovery arrangement associated with the towers of FIGS. 2a and 2b is modified and does not employ the closed circuit fluid circulation typified by 75, 76, 77, 78 of the system of FIGS. 1a to 1d. Instead a supply of the hot gases from towers 118 on their way to the cold tower 114 are passed by conduit 200 to heat exchanger 178 and are cooled and have their moisture in part condensed by the countercurrent of a flow of the cold gases from tower 114 by pipe 179. The partially cooled gas from exchanger 178 is passed by pipe 201 to the secondary cooler and condenser 202 and thence by pipe 203 to the cold tower 114. The cooling circulation indicated at 209 for cooler-condenser 202 is supplied from an outside source.

In this system of FIGS. 2a and 2b the heat exchanger 178 raises the temperature of the cool gases received from cold tower 114 and at the same time provides heat for vaporization of the moisture for humidification, the make-up water for humidification being fed in at 205 at the entrance to the heat exchanger. Condensate from exchangers 178 and 202 are collected and delivered through pipes 206, 207 respectively wholly or in part to the top of the cold tower of the next succeeding stage.

In a similar manner a supply of the hot gases from towers 136, 148 and 160 on their way to the cold towers 128, 142 and 156 respectively are passed to heat exchangers 184, 185 and 186 respectively and are cooled and have their moisture in part condensed by the countercurrent of a supply of cold gases from tower 114 by pipes 219, 221 and 223 respectively. The said supplies of gases from tower 114 are raised in temperature in heat exchangers 184, 185 and 186 and at the same time heat is provided for vaporization of moisture for humidification, this make-up water for humidification being fed in at 220, 222 and 224 respectively.

In any system of heat recovery between fluids entering and leaving either the hot or cold chemical exchange towers, there may be direct physical contact only between the fluids entering and leaving, respectively, a single end of the tower. This limitation is necessary to avoid a redistribution of concentrated material from an enriched fluid to a depleted fluid. Accordingly, the system described herein has made use of the very efficient direct intimate contact methods of heat transfer together with the indirect non-contacting methods as required for the systems to which the invention is illustratively applied herein. For example, in FIGS. 1a to 1d the energy available from the gas leaving the hot tower is transferred by indirect contact heat exchanger (75, FIG. 1a; 84, 85, 86, FIG. 1c) to water which in turn transfers the energy by direct contact (intimate mixing in a countercurrent tower 78, FIG. 1b) with the gas entering the bottom of the hot tower. In this way it is possible to simultaneously heat and humidify the gas entering the hot tower. Likewise in FIGS. 2a and 2b, in exchange 178, 184, 185 and 186 there is a simultaneous heating of the gas and vaporizing of the water required for humidification.

Another modified system may be employed in which the heat exchanges between the hot and cold flows are in general the reverse of those employed in FIGS. 1a and 1b. This modification makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by indirect contact in a countercurrent heat exchanger.

In this modification (FIG. 3) the cold tower 314 may be extended to include a section 314a at its bottom (or a separate tower) which will serve as the direct contact gas cooler-dehumidifier. The cold liquid from the bottom of the cold tower 314 together with an auxiliary flow via 314b passes countercurrent in 314a in contact with the hot humidified gas from the top of the hot tower 318 and becomes heated as the gas is cooled to the cold tower temperature. The cooled gas via 387 then flows upward through the cold tower 314. The hot liquid from the bottom of said direct contacting section 314a is divided. A portion 314c represented by the main cold tower stream plus the added condensate is sent to the hot tower and the balance 314d is sent to a heat exchanger 301 through which indirectly it transfers its energy to a mixture of the cold tower gas and a volume of liquid required for humidification, and thus the cold tower gas outflow 314f is simultaneously heated and humidified as the liquid in 314d is cooled. To make up for inefficiencies of the heat transfer equipment this liquid is further cooled in 314g, as required before returning it to the same direct contacting section 314a via 314b.

With the systems of this invention the operating conditions for the illustrative embodiments described are readily attained within moderate ranges of the typical values set forth in the following tabulations:

| | | | |
|---|---|---|---|
| Cold Tower Temperature | 15° C. | 20° C. | 35° C. |
| Hot Tower Temperature | 70° C. | 80° C. | 190° C. |
| Operating Pressure (absolute) approx. | 25 psi | 80 psi | 275 psi |
| Gas to liquid ratio in cold tower (mols $H_2O$/mols $H_2S$) | 2.21 | 2.20 | 1.8 |
| Concentration of deuterium in product from final stage | 2% | 2% | 2% |
| Number of stages | 4 | 4 | 4 |
| Ratio of liquid flow of a succeeding stage to a preceding stage | ¼ | ¼ | ¼ |
| Concentration of deuterium in feed water | .0143% | .0143% | .0143% |
| Recovery of deuterium from feed water | 12% | 12% | 21% |

The enrichment at which the product may be removed from the system is not dependent on the operating temperatures alone. It is not limited theoretically but is determined by physical conditions such as the overall contacting efficiency of the countercurrent towers which in turn is dependent upon the efficiency of the individual bubble plates or contacting members within the towers. For bubble plate towers of the standard design generally obtained, approximately 80 plates per tower would be required for conditions set forth above.

The molar ratios of total gas to total liquid passing countercurrent in a stage of hot and cold towers are determined so that the corresponding operating lines intervene between the equilibrium curves as represented by the effective fractionation factors for each of the said towers. The effective fractionation factor in the illustrative embodiment is the equilibrium ratio of the mol or atom fraction of total deuterium in the gas phase to the mol or atom fraction of total deuterium in the liquid phase at a particular temperature and pressure.

In the design of apparatus employing this invention the relative cross-sectional area of a stage is governed by fluid flows in that stage. The number of theoretical plates in a stage is determined by the fluid flow rates, the extraction efficiency, the desired enrichment and the net enriched fluid removal from that stage. In the application employed for illustration, the concentrations existing at the ends of the towers of each stage are calculated by the mathematical solution of deuterium, water and hydrogen sulphide material balances with allowance for the net deuterium transport to each successive stage of an amount equal to the steady state deuterium extraction from the feed water.

The degree of enrichment and the relative size of a stage are based on economic considerations and such factors as hold up and equilibrium time.

In deuterium concentration effected by use of this system there is also a concentration of the tritium and at a better fractionation factor, the principal equilibria being indicated as follows:

$$THS + H_2O \rightleftharpoons THO + H_2S$$
$$TDS + HDO \rightleftharpoons TDO + HDS$$

This invention thus provides a practical and highly efficient system for producing a substance (herein exemplified by water) containing a first material (herein exemplified by (D) Deuterium) concentrated therein, by exchanging, at two different temperatures, said first material (exemplified by D) with a second material (exemplified by H) between chemically different fluid substances (exemplified by hydrogen sulfide and water) which are physically separable from each other, and which are each capable of containing each of said materials (D and H).

While there have been described herein what are at present considered preferred embodiments of the invention, modifications and changes and rearrangements may be made therein without departing from the essence of the invention; the exemplary embodiments are to be taken as illustrative and not restrictive of the invention, the scope of which is defined in the appended claims; and all modifications that come within the meaning and range of equivalency of the claims are intended to be included therein.

I claim:

1. In a method of producing a product substance containing concentrated therein an isotope of an element by exchanging, at two different temperatures, said isotope with another isotope of the same element between chemically different first and second fluid substances which are physically separable from each other and which are each capable of containing each of said isotopes, said method being of the type in which
   a. a liquid feed stream of said first fluid is passed in a flow through each of the first and second units, in that order, of a pair of exchange units and thence to a point of disposal,
   b. a gas stream of said second fluid is passed in a flow through each of the second and first units of said pair, in that order, and recirculated to pass therethrough again and again as a closed circulation,
   c. said flows are passed through said units in countercurrent and are contacted in each of the units of said pair to cause an exchange of isotopes of the element between said first and second fluids,
   d. said first and second units are maintained at different temperatures such as to cause said feed-to-disposal stream of said first fluid to become enriched with respect to said isotope in passing through said first unit and to become impoverished with respect to said isotope in passing through said second unit to a point of disposal, while causing said flow of second fluid to become enriched with respect to said isotope in passing through said second unit and to become impoverished with respect to said isotope in passing through said first unit, said method being particularly characterized by the steps of
   e. dividing into two flows the enriched stream of said closed circulation of second fluid passing from said second unit to said first unit,
   f. delivering to said first unit one of the divided flows of said circulation referred to in step (e), and
   g. passing the other of the divided flows of said circulation referred to in step (e) through a subsequent product producing isotope concentration treatment before delivering it to said first unit.

2. A method as claimed in claim 1, in which
   h. the first fluid is a vaporizable liquid and the second fluid is a carrier gas,
   i. said first unit is maintained relatively cold and said second unit is maintained relatively hot,
   j. in step (b) above the following steps (k) and (1) are performed on the flow of impoverished carrier gas recirculated from said first unit to said second unit before it passes through said second unit,
   k. heating thereof in a first zone and simultaneously vaporizing thereinto first fluid in physical contact therewith, followed by
   l. further heating thereof to an increased temperature in a second zone and adding thereto a further quantity of vapor of said liquid therein; and
   m. in which during step (f) above the following steps (n) and (o) are performed on the flow of enriched carrier gas passing from said second unit to said first unit, namely:
   n. transferring heat therefrom to the flow of impoverished carrier gas in said first zone while maintaining said enriched and impoverished flows out of physical contact with each other, thereby cooling the enriched flow passing from said second unit and condensing liquid therefrom while effecting the operations of step (k), and
   o. recovering the enriched liquid condensed in step (n).

3. A method as claimed in claim 2, in which the transfer of heat in step (n) is effected by a plurality of heat transfers to and from an interposed circulation of heat transfer fluid, at least one of which is an indirect contact heat transfer.

4. A method as claimed in claim 3 in which said interposed circulation comprises the liquid referred to in step (k) and is circulated in direct contact with the flow of impoverished gas being heated in said first zone.

5. A method as claimed in claim 3 in which said interposed circulation comprises the condensed liquid referred to in step (n) and is circulated in direct contact with the flow of enriched carrier gas being passed from said second unit to said first unit.

6. A method as claimed in claim 5 in which said interposed circulation is also circulated in direct contact with enriched first fluid being transferred from said first unit to said second unit in step (a).

7. A method as claimed in claim 2 in which the operations referred to in step (1) are effected by introducing into said second zone vapors of said liquid at a temperature greater than said increased temperature.

8. A method as claimed in claim 1, wherein
   h. the first fluid is a vaporizable liquid and the second fluid is a gas soluble therein,
   i. said first unit is maintained relatively cold and said second unit is maintained relatively hot,
   j. in step (a) above, the liquid flow of impoverished first fluid passing from the second unit to a point of disposal is passed to a separate stripping zone where second fluid is stripped therefrom, said stripping being effected by passing thereinto first fluid in gaseous phase, the uncondensed portions of which, with the stripped content of second fluid, are passed to said second unit, and by also passing the stripped first fluid and the condensed portions of the first fluid in gaseous phase, as they leave the stripping zone, in heat exchange relation to the first fluid in liquid phase being passed to said stripping zone from said second unit, whereby the temperature in the stripping zone is substantially higher, and the temperature of said stripped first fluid after being subjected to said heat exchange is also higher, than the temperature of the first fluid leaving the second unit of said pair of units.

9. A method as claimed in claim 8, further comprising the step of
   k. heating the flow of enriched first fluid being passed from said first unit to said second unit by passing in indirect contact heat exchange relation thereto the flow of stripped impoverished first fluid and condensed stripping fluid being passed to a point of disposal from the heat exchange referred to in step (j).

10. A method as claimed in claim 7, in which the first fluid is water, the second fluid is hydrogen sulfide, and the isotope of the element concentrated in the product is deuterium.

11. A method as claimed in claim 8, in which the first fluid is water, the second fluid is hydrogen sulfide, and the isotope of the element concentrated in the product is deuterium.

12. A method as claimed in claim 1, in which:
h. the first fluid is a vaporizable liquid and the second fluid is a carrier gas,
i. said first unit is maintained relatively cold and said second unit is maintained relatively hot,
j. the enriched stream of second fluid which is divided into two flows in step (e) is relatively hot and is saturated with vapor of said first fluid,
k. in step (f) the divided flow being delivered to the first unit is subjected to cooling and condensation of first fluid therefrom and the so condensed first fluid is returned to said second unit together with the first fluid delivered thereto in step (a), and
l. in step (g) vapor of first fluid carried to the subsequent isotope concentration treatment by the other of the divided flows is condensed in said subsequent isotope concentration treatment and in part withdrawn as product and in part returned to the second unit referred to in step (a) together with the first fluid delivered thereto in step (a) and the condensate delivered thereto in step (k).

13. A method as claimed in claim 12, in which:
m. the subsequent isotope concentration treatment comprises at least a first pair of other relatively cold and hot exchange units in which streams of first fluid and second fluid are enriched and depleted in countercurrent contact with each other as in steps (c) and (d),
n. said other divided flow of hot second fluid referred to in steps (g), (j) and (l) is delivered to the hot unit of said first pair of exchange units referred to in step (m) and is passed through at least the hot unit of said first pair of units and is further enriched before it is passed through a cold unit of the other exchange units referred to in step (m), and
o. the condensate of first fluid formed in step (l) is formed by cooling, and condensing first fluid from, enriched second fluid passing from hot to cold units of said other exchange units, and the part of such condensate returned to the second unit in accordance with step (l) is impoverished, before being so returned, by passing it, in admixture with the first fluid stream, in countercurrent contact with the stream of hot second fluid from which said condensate is being formed as said hot second fluid is being enriched as referred to in step (m) and (n).

14. A method as claimed in claim 12, in which the first fluid is water, the second fluid is hydrogen sulfide, and the isotope of the element concentrated in the product is deuterium.

15. In a process for concentrating deuterium oxide by isotope exchange between water and hydrogen sulfide in a first and subsequent stages of hot and cold isotope exchange tower pairs through which water and hydrogen sulfide are made to flow in countercurrent relationship, the improvement comprising establishing a flow of first stage liquid water such that said water flows from a feed source through the first stage cold tower, first stage hot tower and to disposal thereof, establishing flows of water in each of said subsequent stages such that the water delivered to the cold tower of each subsequent stage is more enriched in deuterium oxide than that delivered to the cold tower of any preceding stage, establishing a recycle flow of hydrogen sulfide gas throughout all of the stages such that a portion of the flow of hydrogen sulfide leaving the hot tower of each stage except the last enroute to the cold tower of that stage is diverted to its subsequent stage to flow through first the hot and then the cold towers thereof and then returned to the hydrogen sulfide flow stream of the preceding stage, said portion of hydrogen sulfide flow leaving the hot tower transporting water vapor therewith as humidity, reducing such humidity by cooling and condensing water from said portion of hydrogen sulfide flow leaving the hot tower in each subsequent stage, returning excess water from each subsequent stage to a preceding stage and withdrawing water enriched in deuterium as product from the last stage.

* * * * *